INVENTOR
Jan A. Vanden Broek
BY
Barnes, Kisselle, Raisch & Choate
ATTORNEYS

INVENTOR
Jan A. Vanden Broek
BY
Barnes, Kisselle, Raisch & Choate
ATTORNEYS

United States Patent Office 3,503,652
Patented Mar. 31, 1970

3,503,652
CONTROL FOR ELECTRIC BRAKE
Jan A. Vanden Broek, Ann Arbor, Mich., assignor to Motor Wheel Corporation, Lansing, Mich., a corporation of Ohio
Filed Mar. 8, 1968, Ser. No. 711,665
Int. Cl. B60t *13/68, 13/74*
U.S. Cl. 303—3          22 Claims

ABSTRACT OF THE DISCLOSURE

The energizing coil of an electric brake in a towed vehicle such as a trailer or the like is energized by pulsating direct current. The duty cycle or pulse-width ratio of the energizing current is controlled by a free-running multivibrator which, in turn, is hand-controlled by the driver in the towing vehicle. The hand control can be overridden by an auxiliary hydraulic cylinder and cable system operated by the hydraulic braking system in the towing vehicle. The multivibrator circuitry provides an initial surge current to the electric brake coils when the electric brake is first energized.

---

The objects of the present invention include providing an improved electric brake that achieves efficient and effective braking; that provides smooth control over wide ranges of braking loads; that provides an initially low brake response that is substantially constant at different control circuit sensitivities and linear brake response at different sensitivities; that is reliable and not subject to failure over long periods of continued use; that provides an initial surge current to the brake coils of an electric brake and thereby assures that brake parts are in braking engagement; that reduces heat and power losses incident to certain prior art electric brake controllers using variable power resistors; that minimizes wear in the control and improves reliability by low-level operation; and that provides control circuit operation that is essentially independent of load variations.

Other objects, features and advantages of the present invention will become apparent in connection with the following description, the appended claims and the accompanying drawings in which:

Figure 1:
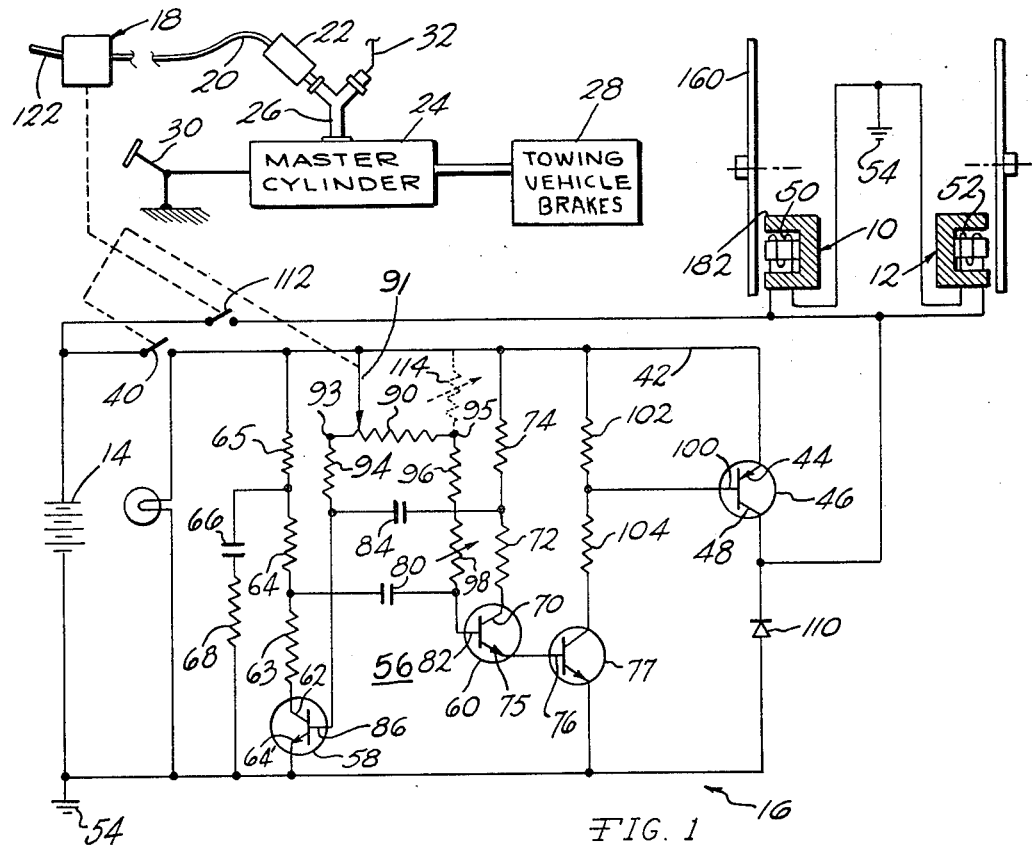
FIG. 1 illustrates an electric brake for a trailer or the like wherein the electric brake is remotely and hand controlled by the driver in a towing vehicle.
Figure 5:
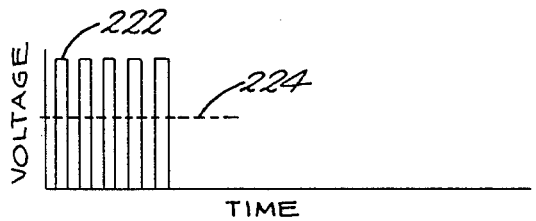
Figure 6A:
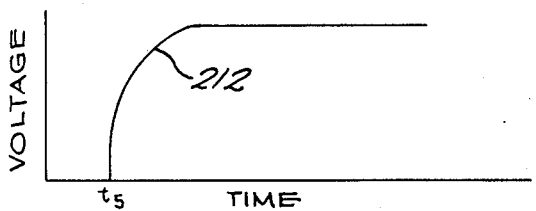
Figure 6B:
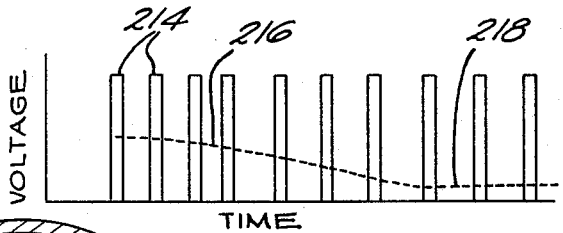

FIG. 5 shows a waveform illustrating operation of the brake controller circuit in FIG. 1 in a modified embodiment of the present invention wherein the electric brake control circuit is under the control of a pressure-sensitive resistor directly responsive to operation of the hydraulic brakes of the towing vehicle; and FIGS. 6a and 6b show waveforms illustrating voltages appearing in the circuit of FIG. 1 upon actuation of the electric brake controller to provide a momentary high power to the electric brake.

Referring more particularly to FIG. 1, the electric brake system generally comprises a pair of electromagnetic brakes 10, 12 (FIGS. 1 and 3) which are arranged to be energized from a battery 14 by the control circuit designated generally at 16. In the preferred embodiment, brakes 10, 12 are mounted on the wheels of a towed vehicle such as a trailer and the like. Control circuit 16 is actuated via a manually operated controller 18 mounted in the towing vehicle at a location convenient for operation by the driver. A flexible cable 20 connects controller 18 to an auxiliary fluid cylinder 22 mounted on a master cylinder 24 by a Y fitting 26. Master cylinder 24 is part of the conventional hydraulic brake system in the towing vehicle to operate the towing vehicle brakes 28 in response to actuation of a foot pedal 30. Fitting 26 is mounted directly on cylinder 24 in place of and interchangeably with a stop light switch which would otherwise be normally mounted on conventional master cylinders. The stop light switch 32 is then mounted on one arm of fitting 26. In general, the electric brakes 10, 12 can be hand operated by the driver via controller 18 but manual operation of the controller 18 can be overridden via cable 20 and cylinder 22 in response to actuation of brakes 28 when pedal 30 is depressed.

Referring more particularly to circuit 16, battery 14 is the towing vehicle battery and the positive terminal of battery 14 is arranged to be connected through a normally closed switch 40 (FIGS. 1 and 2) and a lead 42 to the emitter 44 of an output switching transistor 46. Switch 40 is also mechanically coupled to controller 18 as indicated by dashed lines in FIG. 1. The collector 48 of transistor 46 is connected in series with parallel-connected energizing coils 50, 52 in brakes 10, 12, respectively, and then to ground 54. The transistor 46 is controlled by a free-running multivibrator 56 comprising first and second transistors 58, 60. The collector 62 of transistor 58 is connected in series with three resistors 63, 64, 65 to lead 42, and the emitter 64' is connected to ground. A capacitor 66 is connected in series with a resistor 68 between ground and the junction between resistors 64, 65. Transistor 60 has its collector 70 connected in series with resistors 72, 74 to lead 42 and its emitter 75 connected in an emitter-follower configuration to the base 76 of a drive transistor 77. The collector outputs of transistors 58, 60 are cross-coupled in a generally conventional manner by means of capacitors 80, 84. Capacitor 80 is connected between the base 82 of transistor 60 and the junction of resistors 63, 64, and capacitor 84 is connected between the junction of resistors 72, 74 and the base 86 of transistor 58. Resistors 63, 72 prevent excessive reverse bias voltages.

The bias circuit for the base-emitter circuits of transistors 58, 60 includes a potentiometer 90 having its wiper 91 electrically connected to lead 42 and mechanically coupled to the controller 18 as indicated by dashed lines in FIG. 1. One terminal 93 of potentiometer 90 is connected to base 86 through a resistor 94 and the other potentiometer terminal 95 is connected to base 82 through serially connected resistors 96, 98. Resistor 98 is adjustable to balance the braking action of brakes 10, 12 with the braking action of brakes 28 and adjust the sensitivity for manual operation of controller 18.

Transistor 77 drives the base 100 of transistor 46 via resistors 102, 104. The emitter-collector circuit of transistor 46 is connected in series with the paralleled coils 50, 52. A silicon diode 110 is connected between ground 54 and the collector 48 of transistor 46 across the paralleled coils 50, 52. Diode 110 is poled to block current therethrough when transistor 46 is conducting and to provide a return path for circulating currents from coils 50, 52 when transistor 46 is switched off. Coils 50, 52 are also arranged to be connected directly across battery 14 through a normally open switch 112, bypassing circuit 16.

A variable resistor 114 is also shown in FIG. 1 in dotted lines connected between potentiometer terminal 95 and lead 42 to illustrate an alternative embodiment of the present invention. Resistor 114 is a pressure sensitive resistor whose value changes in response to fluid pressure applied thereto. In the alternative embodiment, resistor 114 is mounted directly on fitting 26 in place of cylinder 22 to respond to variations in brake fluid pressure in the master cylinder 24.

Figure 2:
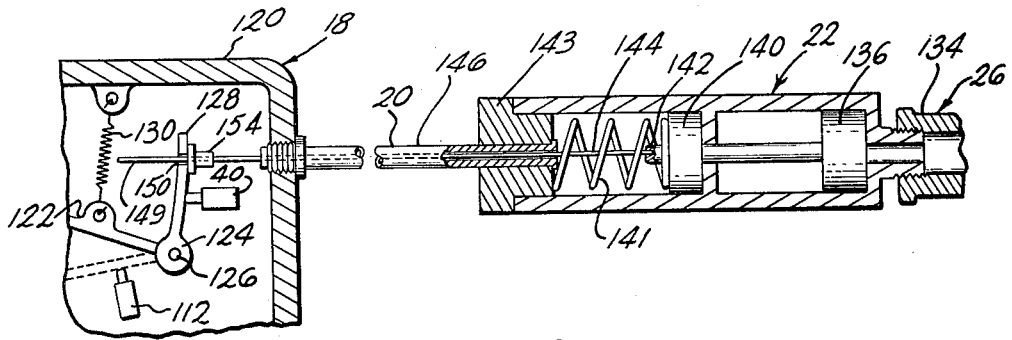
FIG. 2 is a fragmentary view partly in section and illustrating an auxiliary hydraulic cylinder and cable system interconnecting the hydraulic braking system of the towing vehicle to the electric brake control.

Referring more particularly to FIG. 2, the controller 18 comprises a housing 120 which is mounted by suitable means (not shown) on the dash board, underneath the instrument panel, of the towing vehicle. Alternatively, housing 120 could be mounted at other convenient locations in the towing vehicle such as on the steering column. A control lever 122 integral with a shaft 124 is pivotally mounted at 126 on housing 120. The free end of lever 122 projects outwardly through the front of housing 120 for hand actuation of the electric brakes 10, 12. An integral crank arm 128 on shaft 124 is disposed at approximately a right angle to lever 122 to project upwardly as viewed in FIG. 2. Switch 40 (FIGS. 1 and 2) is mounted on housing 120 to be actuated by arm 128 to an open position when arm 128 is in the position illustrated in full lines in FIG. 2 which corresponds to a condition when brakes 10, 12 are "fully off." Arm 128 and lever 122 are urged toward the "fully off" position by a spring 130. Switch 40 limits pivotal movement of arm 128 at the off position although other suitable stop means may be used. Switch 112 (FIGS. 1 and 2) is mounted on case 120 for engagement by lever 122 when lever 122 is moved downwardly to the position illustrated in dotted lines which corresponds to a "fully on" condition of brakes 10, 12. The components of circuit 16 are also mounted within housing 120 and the wiper arm 91 of potentiometer 90 is connected directly to shaft 124 so that rotation of shaft 124 in response to pivotal movement of lever 122 varies the potentiometer setting.

Cylinder 22 is mounted directly on fitting 26 by a suitable fitting 134 at the inlet end of cylinder 22. Cylinder 22 comprises a piston 136 having a suitable seal (not shown), commonly an O-ring or a cup seal. Piston 136 is actuated from right to left as viewed in FIG. 2 in response to hydraulic fluid pressure increases at the master cylinder 24 when pedal 30 is operated. A spring seat 140 is integrally connected to piston 136 for comovement therewith and a compression spring 141 is mounted between seat 140 and the opposite end wall 143 of the auxiliary cylinder 22 to bias piston 136 in a direction toward the right as viewed in FIG. 2 in the absence of hydraulic pressure at the inlet of cylinder 22.

Cable 20 is a Bowden-type cable having an inner control wire 144 movable longitudinally inside an outer sheath 146. Wire 144 has one end secured in a boss 142 on seat 140 as by a crimped or soldered connection. Sheath 146 extends through the end wall 143 of cylinder 22 and is secured therein by suitable means such as soldering or an appropriate fitting. The other end of the sheath 146 is detachably mounted on the rear wall of housing 120 and the other end 149 of the wire 144 extends into housing 120 and passes freely through a small aperture 150 in the arm 128. A flanged ferrule 154 is secured on wire 144 as by crimped or soldered connection. Ferrule 154 is located at an appropriate point on wire 144 so as to be disposed just behind arm 128 when arm 128 is in its raised, "fully off" position with no fluid braking pressure applied to piston 136.

Figure 3:
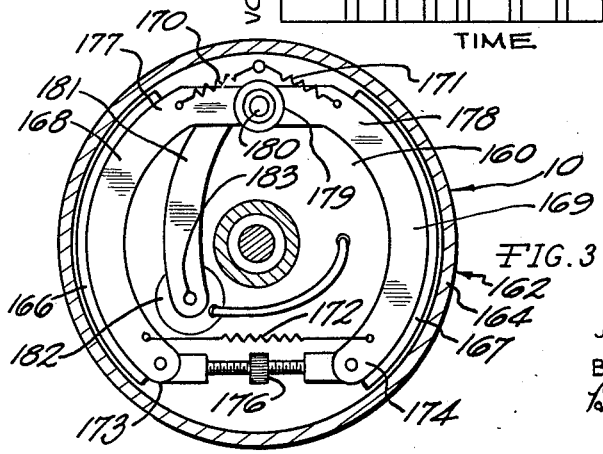
FIG. 3 shows one type of electric brake usable with the brake control system of the present invention.

By way of further disclosure, one of the brakes 10 is shown in greater detail in FIG. 3 to illustrate one type of brake which may be operated by a brake control circuit of the present invention, but it is to be understood that the control circuit and braking system may be used with other types of electric brakes. Disc 160 is located adjacent a brake drum 162 having a rim 164 engageable with linings 166, 167 mounted respectively on conventional brake shoes 168, 169. Brake shoes 168, 169 are retained by springs 170, 171, 172 and their lower ends 173, 174 are connected together by the usual adjustable linkage 176. The upper ends 177, 178 of brake shoes 168, 169 abut an operating cam 179 on a pin 180 affixed to a pivotal level 181 to which a puck 182 (FIGS. 1 and 3) is attached by means of a pin 183. Brake drum 162 and disc 160 rotate with the wheel of the vehicle on which they are installed whereas pin 180 and the associated support structure for shoes 168, 169 and lever 181 are mounted stationary relative to the drum.

The function and operation of the control for the electrically operated brake described hereinabove and for the circuit 16 can be best understood in connection with the waveforms shown in FIGS. 4–6. With control arm 122 in its raised "fully off" position engaging switch 40, switch 40 will be open and hence no power from battery 14 is applied to circuit 16. When it is desired to actuate brakes 10, 12, the operator moves lever 122 downwardly causing arm 128 to disengage from switch 40 whereupon switch 40 closes to energize control circuit 16. Simultaneously, the wiper arm 91 is moved from its extreme left-hand position on potentiometer 90 toward the right as viewed in FIG. 1. Disregarding for the moment the effect of capacitor 66 when switch 40 first closes, one of the transistors 58, 60 will conduct initially and establish free-running operation of the multivibrator 56 with transistors 58, 60 being rendered alternately conducting via the conventional cross coupling through capacitors 80, 84. When transistor 60 conducts, transistor 77 is rendered conductive with the emitter current of transistor 60 driving transistor 77 into saturation. Conduction of transistor 77 provides current drive via resistor 104 to transistor 46 to render transistor 46 conducting and thereby connect coils 50, 52 across battery 14. Energization of coils 50, 52 actuates brakes 10, 12.

In general, the braking force applied by the brakes 10, 12 depends primarily on the setting of potentiometer 91, the values of resistors 94, 96 (together with resistor 98) and the timing capacitors 80, 84 and also on the values of resistors 63, 64, 65 and resistors 72, 74. For a small displacement of lever 122, wiper 91 will be moved just slightly from the terminal 93 and in this position the time constants for capacitors 80, 84 are such that during each cycle or repetition period of multivibrator 66, transistor 60 conducts for a short time by comparison to the time during which transistor 58 conducts. Hence the pulse width ratio for the multivibrator output is low and correspondingly the duty cycle at coils 50, 52 is low.

Figure 4A:
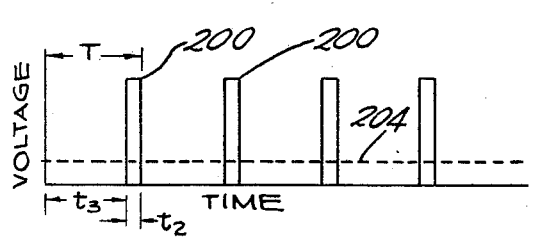
FIGS. 4a and 4b show waveforms illustrating low duty-cycle operation and high duty-cycle operation, respectively, of the brake controller circuit of FIG. 1.

The waveform for the voltage output applied to coils 50, 52 from source 14 during low duty-cycle operation corresponding to low braking force is shown in FIG. 4a. FIG. 4a can also be considered as representing the pulse train developed by multivibrator 56. With wiper 91 positioned at or near the potentiometer terminal 93, a train of pulses 200 will be applied to coils 50 from battery 14. During each cycle T of the multivibrator 56 the duration $t_2$ of each pulse 200 is small compared to the off time $t_3$ and hence the average D.C. power applied to coils 50, 52 over several cycles will be low as indicated by the level 204 (FIG. 4a). During the off time $t_3$, diode 110 prevents the voltage across coils 50, 52 from exceeding the supply voltage of battery 14 due to the inductive loading effect of coils 50, 52, or stated differently, when the fields in coils 50, 52 collapse, diode 110 provides a return path for circulating current through coils 50, 52 during the off time of transistor 46. With the electrical and mechanical time constants of coils 50, 52 and brakes 10, 12 longer than the cycle time T of multivibrator 56, the operation of coils 50, 52 is as though the coils were supplied by the average D.C. voltage level 204.

Figure 4B:
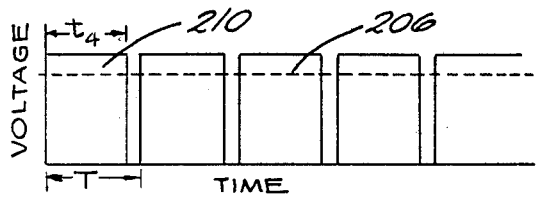

As higher braking forces are required, lever 122 is moved further downwardly in turn moving the wiper 91 further to the right as viewed in FIG. 1. The time constant for capacitor 84 is increased, increasing the "off time" of transistor 58. Simultaneously the time constant for capacitor 80 is decreased, increasing the "on time " of transistor 60 by an equal amount so that the frequency or cycle time T of the multivibrator 56 does not change. FIG. 4b illustrates the pulses 210 applied to coils 50, 52 from battery 14 when control lever 122 is moved to an extreme lower position just prior to engagement with switch 112. The cycle time T of multivibrator 56 remains the same whereas the "on time" $t_4$ of transistor 60 is substantially greater than the "on time" $t_2$ (FIG. 4a) at low duty-cycle operation. Hence FIG. 4b illustrates a high duty-cycle operation providing an apparent average D.C. voltage level 206 substantially higher than the corresponding level 204 during the low duty cycle.

Maximum braking forces are applied when lever 122 is moved to its lowermost position engaging with and actuating switch 112 to connect coils 50, 52 directly across battery 14. Switch 112 also provides a safety feature in the event that the remaining portion of control circuit 16 should fail.

With respect to actuation of brake 10, when coil 50 is energized puck 182 is magnetically attracted against the rotating disc 160. Assuming disc 160 is rotating clockwise as viewed in FIG. 3, the frictional forces exerted by disc 160 on puck 182 swings lever 181 on pivot shaft 180 to the left as viewed in FIG. 3. This pivotal movement of lever 181 rotates the operating cam 179 which in turn operates the upper ends of shoes 168, 169 so that the shoes move outwardly to engage linings 166, 167 with drum 162. The shoes are shown in an operated position in FIG. 3. As the pulse width ratio for the multivibrator output is increased, the corresponding increased duty cycle or apparent D.C. level of the current in coil 50 forces puck 182 harder against disc 160, thus increasing the frictionally induced torque in lever 181 and thereby moving puck 182 and lever 181 farther to the left which in turn further increases the applied braking forces.

Referring back to the initial energization of the control circuit 16 and the effect of capacitor 66, just prior to closure of switch 40 there is no charge on capacitor 66 but upon closure of switch 40 the voltage at the juncture between resistors 64, 65 rises instantaneously to a value determined by the values of resistors 65, 68. The effect of capacitor 66 as it charges exponentially to a voltage determined by the average current in transistor 58 and the value of resistor 65 is shown in FIGS. 6a and b. In FIG. 6a the time at which the switch 40 closes is designated $t_5$ and the charging of capacitor 66 is illustrated by the voltage curve 212. The effect of capacitor 66 is to initially increase the frequency of multivibrator 56 as illustrated by the higher frequency pulses 214 (FIG. 6b). The increase in frequency has the corresponding effect in coils 50, 52 of increasing the apparent D.C. level as indicated at 216. As the frequency decreases to a steady state value when capacitor 66 is fully charged, a lower average voltage level 218 is provided. The higher level 216 may be required in certain brake systems to assure that puck 182 is quickly and firmly brought into contact with plate 160. However, it should be understood that in other applications the initial surge feature is not required, and hence capacitor 66 and resistor 88 can be omitted and a single resistor used in place of resistors 64, 65.

With respect to operation of the brakes 10, 12 in response to actuation of the foot brake pedal 30, piston 140 is moved from right to left as viewed in FIG. 2 against the pressure of spring 141 by an increase in fluid pressure in the master cylinder 24 upon operation of foot pedal 30. The resulting movement of wire 144 pushes ferrule 154 against the crank arm 128 to thereby pivot arm 128, shaft 124 and lever 122 from the "fully off" position toward the "fully on" position. The constants of spring 141 are selected to correlate the rotation in arm 128 as a result of given brake pressures with the variation required at potentiometer 90 to balance the brakes 28 with brakes 10, 12. The maximum displacement of spring seat 140 and wire 144 is also chosen to correspond to the maximum travel of lever 122 to just bring lever 122 into engagement with switch 12 and actuate the switch. Hence the degree to which the brakes 10, 12 are actuated upon application of the car brakes 28 is controlled through the brake controller 18 in synchronism with and in proportion to the amount of braking effort being applied to the car brakes 28. When pedal 30 is released, spring 141 forces piston 136 back to its original "fully off" position and spring 130 returns lever 122 back to its "fully off" position. The lost motion connection between wire 144 and arm 128 allows the controller 18 to be manually actuated by lever 122 without affecting the car brakes 28 since arm 128 slides freely along the free end 149 of the wire.

Resistor 98 varies the "off time" of transistor 60 and incidentally varies the frequency for a given setting of potentiometer 90. Resistor 98 is used to adjust the sensitivity of the trailer brakes 10, 12 for manual operation and the resistor or a variable tap thereon is accessible to the driver. At all settings of resistor 98 the brake response to actuation of lever 122 is linear over the operating range of the lever and the lowest achievable duty cycle remains substantially constant. Stated differently, resistor 98 changes the slope of the straight line response for braking forces versus displacement of lever 122, but the response curve always starts at or near zero. Although a rough balance between the braking effort at the brakes 28 and the brakes 10, 12 is obtained by selection of spring 141, a finer balance is obtained by adjusting resistor 98. Hence the same control circuit 16 can be used with various different types of trailers and various different loads. The resistor 98 is not varied during braking operations.

Attention is now directed to FIG. 5 in connection with the operation of the alternative embodiment wherein resistor 114 replaces cylinder 22 and cable 20. Operation of the foot pedal 30 and the corresponding increase in pressure in master cylinder 24 decreases the value of resistor 114. The connection of resistor 114 in the control circuit 16 is such that variations in resistor 114 affect both the frequency and the duty cycle or pulse width ratio for multivibrator 56. Hence with increased pressure in cylinder 24 and a corresponding decrease in the value of resistor 114, voltage pulses 222 are applied to coils 50, 52. By comparison to FIG. 4a, the frequency of pulses 222 is increased over that of pulses 200 and the "off duty cycle" in FIG. 5 would be decreased for the same setting of potentiometer 90, in turn increasing the apparent voltage to the level 224.

It will be apparent from the foregoing description that the electric brake contol of the present invention can achieve smooth and accurate control over a wide range of braking forces. Duty cycles from five percent to ninety-five percent can be achieved in economically practical controls. The frequency of operation of multivibrator 56 remains essentially constant during adjustment of wiper 91. The controller output voltage applied to coils 50, 52 is essentially independent of the load presented by the coils, either due to the variation in the braking forces or to using different types of coils. The output voltage applied to the coils is determined primarily by the voltage at source 14 when transistor 46 is saturated. There is little, if any, heat dissipated by the circuit 16 and most of the energy dissipation occurs during switching of transistor 46 resulting in high electrical efficiency and minimum drain on battery 14. The solid state circuitry and operation of the potentiometer 90 at low-level signals achieves very reliable operation.

The mechanical coupling from the master cylinder to the controller 18 via the auxiliary cylinder 22 and cable 20 provides a very simple construction that is easily installed in the hydraylic brake system of the towing vehicle, especially in combination with the particular control circuit described. The system can be operated either with or without the interconnecting cable system and the cable system can be readily added without major disassembly of the controller 18 and without any modification in the control circuit 16. The auxiliary cylinder 22 and the cable 20 are rugged enough to provide safe operation of both brakes 28 and brakes 10, 12. It is unlikely that the brakes 28 will fail due to failure in the auxiliary cylinder and cable system.

It should be understood that the control for electric brakes has been described hereinabove for purposes of explanation and illustration and is not intended to indicate limits of the present invention.

I claim:

1. An electric brake system for use with a vehicle comprising electrically operable brakes having at least one coil and friction means actuated by said coil to apply braking forces, a source of electrical energy, electronically operated switch means having a main current conducting path and a control signal input for controlling current conduction through said main path in response to a control signal at said control input, said switch means being operatively connected to said source and to said coil to connect and disconnect said coil to and from said source, control signal generating means electrically coupled to said control input and operative to generate a control signal having a repetitive waveform such that said switch means sequentially connects and disconnects said coil to said source during each repetition period, variable impedance means operatively connected in circuit with said control signal generating means to determine the time during each repetition period that said switch means connects said coil to said source, and means operable by a driver of said vehicle to selectively vary said impedance means to thereby vary the time during each repetition period that said coil is connected to said source.

2. The brake system set forth in claim 1 wherein said main current conducting path of said switch means is connected in series with said coil across said source and wherein circuit means are operatively coupled to said coil to maintain current flow through said coil when said switch means disconnects said coil from said source.

3. The brake system set forth in claim 2 wherein said current maintaining circuit means comprises an asymmetrical conducting device connected in series with said switch means across said source and in parallel with said coil.

4. The brake system set forth in claim 3 wherein said main current conducting path of said switch means comprises first and second main electrodes, one of said main electrodes is electrically connected to one terminal of said source, the other of said main electrodes is electrically connected to one terminal of said coil and one terminal of said asymmetrical conducting device, the other terminal of said coil is connected to the other terminal of said source and to the other terminal of said asymmetrical conducting device, and wherein said asymmetrical conducting device is poled to block current flow therethrough from said other electrode to said other terminal of said source when said switch means is conducting.

5. The brake system set forth in claim 1 wherein said control signal generating means includes oscillator means and is operative to generate a repetitive series of unidirectional pulses forming said control signal, the duration of each of said pulses representing said time during which said coil is connected to said source by said switch means, and wherein said impedance means is operatively connected in circuit with said control signal generating means to vary the pulse width ratio of said pulse series.

6. The brake system set forth in claim 5 wherein said oscillator means is a multivibrator comprising first and second electronic control devices each of which has a pair of output electrodes and a pair of input electrodes for controlling conduction through said output electrodes, first reactive impedance means coupling one of said output electrodes of one of said electron control devices to one of said input electrodes of said other electron control devices, second reactive impedance means coupling one output electrode of the other of said electron control devices to one input terminal of said one electron control device, and adjustable bias circuit means coupled to said input electrodes of both of said electron control devices and operative to increase the bias at one of said devices while simultaneously decreasing the bias of the other of said devices to thereby vary the pulse width ratio of said output signal and vary said time during each repetition period that said coil is connected to said source.

7. The brake system set forth in claim 6 wherein the other input terminal of each of said electron control devices is connected to one terminal of said source, and wherein said bias means comprises a potentiometer having first and second terminals, one of said potentiometer terminals being coupled to said one input terminal of said first electron control device and the other of said potentiometer terminals being coupled to said one input terminal of said other electron control device, and an adjustable potentiometer tap operatively connecting a point electrically between said first and said second potentiometer terminals to the other terminal of said source so that the decrease in bias at said other device is substantially equal and opposite to the increase in bias at said one device when said potentiometer tap is adjusted.

8. The brake system set forth in claim 7 wherein said one potentiometer terminal is connected to said one input terminal of said first electron control device through a series resistor and said series resistor is manually adjustable to vary the pulse width ratio of said output signal for a given setting of said potentiometer tap to thereby adjust the sensitivity of said electric brake system in response to actuation of said manually operable means and wherein said electrically operable brakes are mounted on a towed vehicle so that variation of said series resistor balances the braking forces at said electrically operable brakes with the braking forces at the brakes on the towing vehicle.

9. The braking system set forth in claim 7 wherein said one potentiometer terminal is also connected to said one terminal of said source through an impedance the value of which varies in response to fluid pressure variations applied thereto, said electrically operable brakes are mounted on a vehicle towed by a towing vehicle having a hydraulic braking system and wherein said pressure variable impedance is operatively mounted in said hydraulic brake system to respond to fluid pressure variations therein.

10. The brake system set forth in claim 6 wherein an output load circuit is connected to one of said output electrodes of one of said electron control devices and to one terminal of said source, a capacitor connected between said load circuit and the other terminal of said source, a switch to complete the connection of said main electrodes of said one electron control device to said source so that upon initial closure of said switch said multivibrator is set into free running operation at a frequency determined in part by the initial charge on said capacitor just prior to closure of said switch and so that as said capacitor charges the operating frequency of said multivibrator decreases to thereby provide an initial current surge through said coils.

11. The braking system set forth in claim 1 wherein said means operable by a driver of said vehicle comprises a hand operated movable member operable to vary the impedance of said variable impedance means by movement of said member.

12. The brake system set forth in claim 11 wherein a second impedance means variable in response to fluid pressure variations applied thereto is connected in circuit with said control signal generating means to vary the time during each repetition period that said switch means connects said coil to said source, said electrically operable brakes are mounted on a vehicle towed by a towing vehicle having a hydraulic brake system and wherein said pressure variable impedance means is operatively connected to said hydraulic brake system of said towing vehicle to respond to pressure variations in said towing vehicle brake system.

13. The brake system set forth in claim 1 wherein a second variable impedance means is operatively connected in circuit with said control signal generating means, said control signal generating means comprises a multivibrator whose output has a predetermined frequency and a predetermined pulse width ratio for a predetermined value of said second variable impedance means, said second impedance means being operable to vary both the pulse width ratio and the frequency of said multivibrator output, and second means manually operable by said driver to selectively adjust said second variable impedance means to thereby adjust the sensitivity of said electrically operable brakes.

14. The brake system set forth in claim 1 wherein said control signal generating means comprises a multivibrator, a switch for connecting said multivibrator to said source to initiate free running operation of said multivibrator and thereby initiate actuation of said brakes, and wherein a capacitor is operatively connected in circuit with said multivibrator so that upon initial closure of said switch said multivibrator develops an output having a predetermined frequency and a predetermined pulse width ratio but as said capacitor charges said multivibrator develops an output whose frequency and pulse width ratio are substantially less than said predetermined frequency and said predetermined pulse width ratio, respectively.

15. The brake system set forth in claim 1 wherein said control signal generating means includes a multivibrator comprising a first transistor, a second transistor, each of said transistors having an emitter electrode, a collector electrode, and a base electrode, a first output circuit connected to the collector of said first transistor and a second output circuit connected to the collector of said other transistor, first reactive impedance means coupled between the first output circuit and the base of said second transistor, second reactive impedance means coupled between said second output circuit and said base of said first transistor, and a bias circuit comprising a potentiometer having first and second terminals and a variable tap, one of said terminals being connected to the base of one of said transistors and the other of said terminals being connected to the base of the other transistor and said potentiometer tap being connected to one terminal of said source, a third transistor also having a collector electrode, a base electrode and an emitter electrode, said emitter of said second transistor being directly connected to said base of said third transistor in an emitter-follower configuration, and wherein said third transistor drives said control signal input of said electronically operated switch means.

16. A control circuit for electrically operated brakes adapted for use with a vehicle having a source of electrical energy and wherein said brakes comprise at least one coil and friction means actuated by said coil to apply braking forces, comprising electronically operated switch means having a main current conducting path and a control signal input for controlling current conduction through said main path in response to a control signal at said control input, said switch means being adapted for operative connection to said source and to said coil for connecting and disconnecting said coil to and from said source, an oscillator means constructed to generate pulsating output signals having a frequency and pulse width ratio correlated to current requirements of said coil to develop a predetermined braking force, circuit means coupling said oscillator output signals to said input of said switch means, variable impedance means operatively connected in circuit with said oscillator means to vary the pulse width ratio of said oscillator output signals and means operable by a driver of said vehicle to selectively vary said impedance means to thereby vary the current pulses supplied to said coil according to the braking forces required.

17. The control circuit set forth in claim 16 wherein said electrically operated brakes have mechanical and electrical time constants that are greater than the operating frequency of said oscillator output signals whereby the response of said brakes to pulsating current is substantially the same as when said brakes are energized by a steady direct current.

18. The control circuit set forth in claim 16 wherein a second variable impedance means is operatively coupled in circuit with said oscillator means to also vary the pulse width ratio of said output signals and second means manually operable by said driver to selectively adjust said second impedance means and thereby adjust the sensitivity of said electrically operated brakes.

19. In combination with a towed vehicle and a towing vehicle wherein the towing vehicle is equipped with a hydraulic braking system and the towed vehicle is equipped with electrically operated brakes having at least one energizing coil therein for connection to a source of electrical energy to actuate said brakes and wherein an electric brake controller is mounted in said towing vehicle for manual actuation by the operator of said towing vehicle, a control circuit for energizing said electrically operated brakes comprising electronically operated switch means having a main current conducting path and a control signal input for controlling current connection through said main path in response to a control signal at said control input, said switch means being connected in series with said coil across said source to connect and disconnect said coil to and from said source, an oscillator constructed to generate pulsating output signals having a frequency and a pulse width ratio correlated to current requirements of said coil to develop a predetermined braking force, circuit means coupling said oscillator output signals to said input of said switch means, variable impedance means operatively connected in circuit with said oscillator to vary the pulse width ratio of said oscillator output signals, first means in said controller operable by a driver of said towing vehicle to selectively vary said impedance means to thereby vary the current pulses supplied to said coil according to the braking forces required, and second means operably connected to said hydraulic braking system to vary said impedance means to thereby vary the current supplied to said coil in response to braking forces generated in said hydraulic braking system.

20. The combination set forth in claim 19 wherein said variable impedance means comprises first and second variable impedance means operable independently of one another, said first variable impedance means being varied by said first means and said second variable impedance means being varied by said second means.

21. The combination set forth in claim 19 wherein said variable impedance means comprises a single impedance means variable selectively by said first means and by second said means.

22. The brake system set forth in claim 1 wherein said means operable by a driver of said vehicle comprises a brake foot pedal and means operably coupling movement of said brake pedal to said variable impedance means so as to vary the impedance thereof in response to said brake pedal movement such that depressing said brake pedal increases the time during each repetition period that said switch means connects said coil to said source.

References Cited

UNITED STATES PATENTS 3,423,135   1/1969   Beltramo _____ 303—3

DUANE A. REGER, Primary Examiner

U.S. Cl. X.R.

303—20